No. 835,130. PATENTED NOV. 6, 1906.
T. GEORGE.
POWER ROLLER.
APPLICATION FILED FEB. 23, 1906.

3 SHEETS—SHEET 1.

WITNESSES
INVENTOR

No. 835,130. PATENTED NOV. 6, 1906.
T. GEORGE.
POWER ROLLER.
APPLICATION FILED FEB. 23, 1906.

3 SHEETS—SHEET 2.

WITNESSES
M. A. Keller
C. E. Eggers

INVENTOR
Thomas George
by James K. Bakewell
his attorney

No. 835,130. PATENTED NOV. 6, 1906.
T. GEORGE.
POWER ROLLER.
APPLICATION FILED FEB. 23, 1906.
3 SHEETS—SHEET 3.
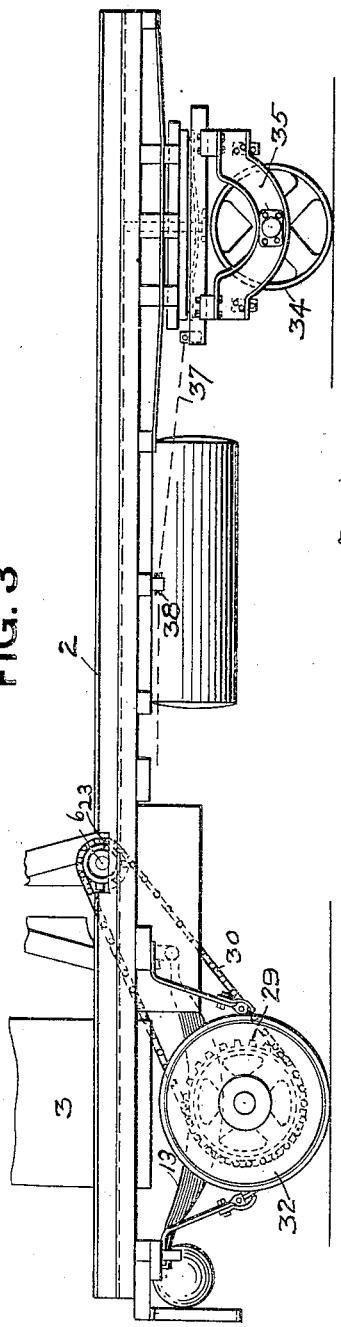
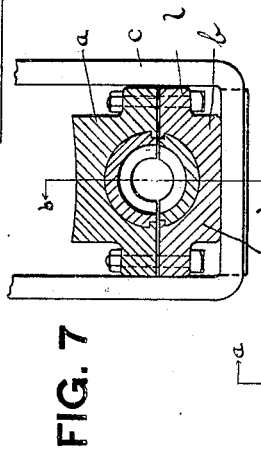
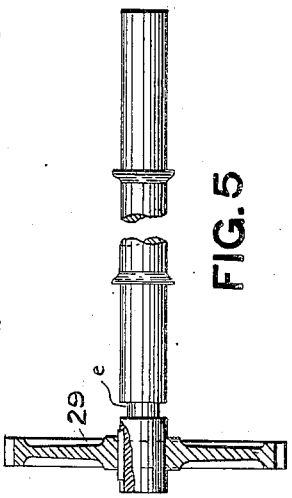
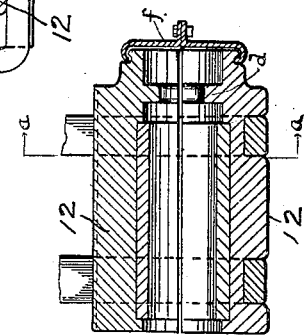
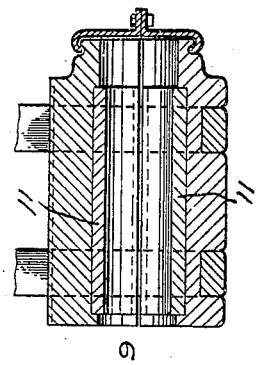
WITNESSES
M. A. Keller
C. E. Eggers
INVENTOR
Thomas George
by James K. Bakewell
his attorney

UNITED STATES PATENT OFFICE.

THOMAS GEORGE, OF PITTSBURG, PENNSYLVANIA.

POWER-ROLLER.

No. 835,130.   Specification of Letters Patent.   Patented Nov. 6, 1906.

Application filed February 23, 1906. Serial No. 302,361.

*To all whom it may concern:*

Be it known that I, THOMAS GEORGE, residing in Pittsburg, in the county of Allegheny and State of Pennsylvania, have invented a certain new and useful Improvement in Power-Rollers, of which the following is a full, clear, and exact description, reference being had to the accompanying drawings, forming part of this specification, in which—

Figure 1:
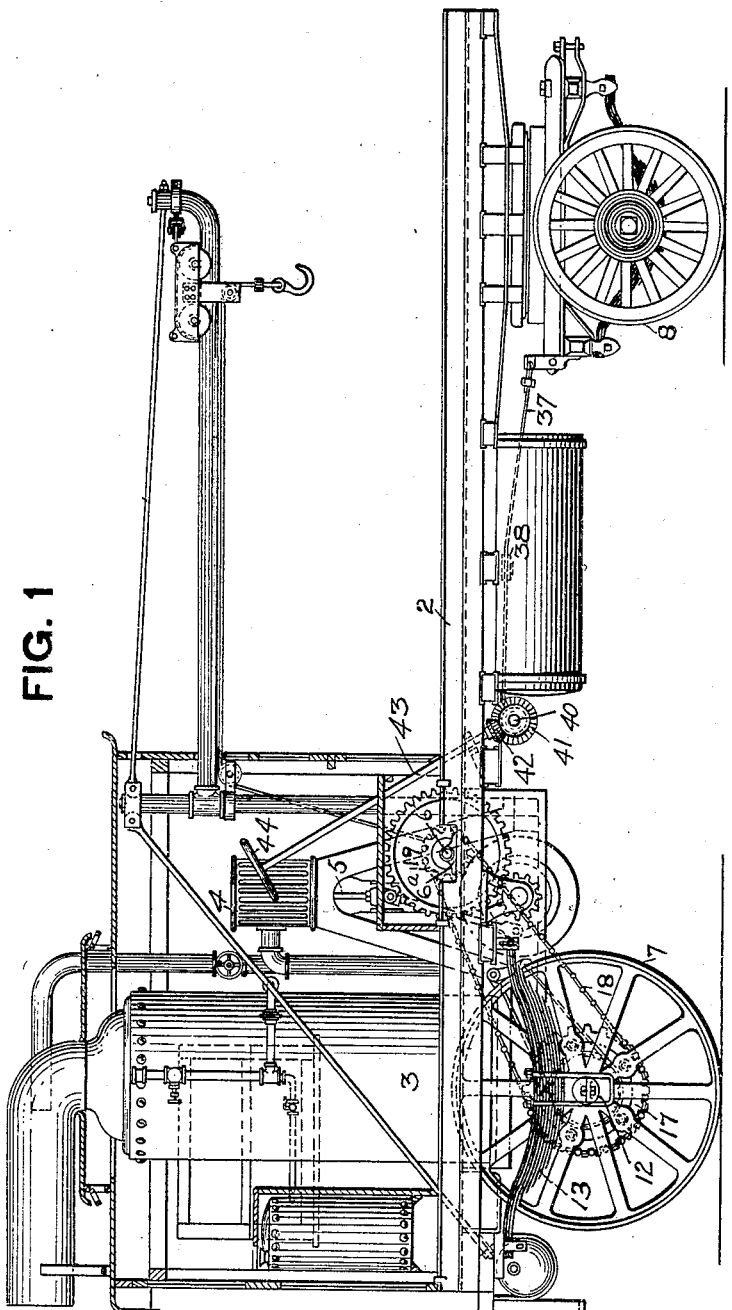
Figure 2:
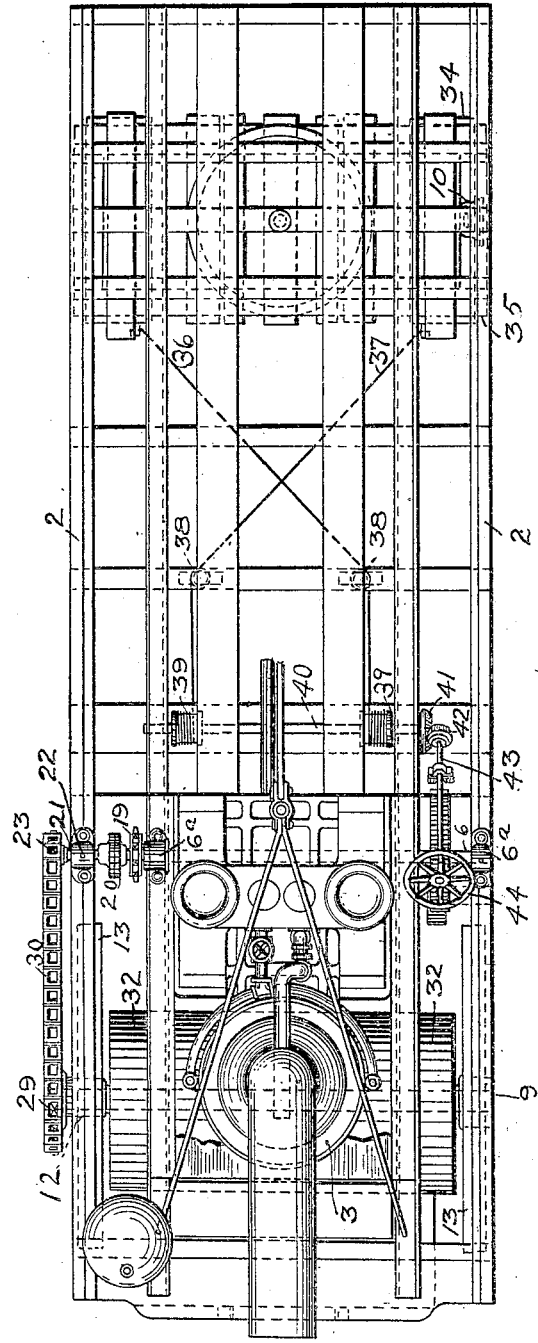

Figure 1 is a side elevation showing the apparatus mounted on wheels to enable it to be transported from place to place. Fig. 2 is a plan view of the apparatus having grade-rollers substituted for the wheels, the apparatus being adapted to be used in rolling roads. Fig. 3 is a side elevation of the body of the apparatus having sod or asphalt rollers substituted for the grade-rollers. Fig. 4 is a plan view, partially broken away, of the axle employed with the wagon-wheels. Fig. 5 is a like view of the axle employed with the rollers. Fig. 6 is a vertical sectional view of the removable journal-box adapted for the wagon-wheels on the line VI VI of Fig. 7. Fig. 7 is a vertical cross-sectional view on the line VII VII of Fig. 6. Fig. 8 is a longitudinal vertical sectional view of the fixed axle-box, which is used on one side of the apparatus and with each form of rollers.

My invention relates to an improvement in power-rollers; and it consists in devices arranged to permit of the substitution of rollers of different grade, size, and weight or of wheels, according to the use to which the apparatus is to be put, or in case the apparatus is to be transported from one place to another and also in devices by means of which the apparatus may be efficiently steered.

Heretofore in the ordinary rollers now in common use it has been impossible to use the roller for any other than the particular kind of work to which it is adapted without material alterations in the apparatus itself—as, for instance, a grade-roller has been only adapted to roll roads and for like purposes, a different apparatus being necessary to roll sod or asphalt, and where it is necessary to transport the roller from one place to another it has been usually caused to travel on its roller, often doing serious injury to the apparatus through the jarring of the same and to the surface of the roads. Another mode of transporting such rollers now in common use is to place them on wagons and transport them by means of horses, which involves labor and expense.

I will now describe my invention so that others skilled in the art may manufacture and use the same.

In Fig. 1 I have shown a modern power apparatus employed in driving power-rollers, the apparatus being supported by a frame or platform 2. This apparatus consists of a boiler 3, cylinder 4, and piston 5, connected by suitable mechanism with a power-shaft 6. This apparatus, as shown in Fig. 1, is mounted on wheels 7 and 8, which are fixed to their axles, the axles revolving in suitable journal-boxes 9 10, which are so constructed and arranged as to permit of the ready removal and replacement of the axles therefrom. To enable this removal, I employ on one side of the platform 2 a fixed journal-box 9, which may be secured to a spring 13 and is shown in detail in Fig. 8. This journal-box may be made in two parts and is provided with suitable brasses 11 and is adapted to receive the end of the axle outside of the wheel 7.

At the other side of the frame 2 I employ a removable journal-box 12. (Shown in detail in Figs. 6 and 7.) This journal-box is made in two parts, being adapted to bolt about the axle and to the spring 13, the latter being bolted to the frame or platform 2. The journal-box 9, already described, is also adapted to be bolted to a similar spring on the other side of the frame, but not shown in the drawings. This journal-box 12 is made in two parts $a$ $b$, bolted together and held in the strap $c$. Where it is used for the wheel 7, it is provided with an interior annular projection $d$, which fits in an annular groove $e$ in the axle. Where a removable box is employed with the roller-axles, the cap $f$ of the journal-box is omitted, which permits the end of the axle to project through the journal-box sufficiently to receive the sprocket-wheel 29, the annular recess $e'$ being formed in the axle inside of the sprocket-wheel. By unbolting the strap $c$ from the spring 13 the journal-box is removable from the axle, allowing the axle and wheel to be removed from the apparatus. Inside of the wheel 7 at the side of the frame 2, at which is the removable journal-box 12, and keyed to the axle of the wheel 7 is a sprocket-wheel 17, from which a sprocket-chain 18 extends to a sprocket 19, keyed to the power-shaft 6. This power-shaft 6 is mounted in suitable journal-boxes $6^a$ on the frame 2, and at the end of the shaft is a coupling 20, by means of which an extension 21 may be coupled to the power-shaft, the extension passing through a journal-box 22. (See Fig. 2.) This shaft 21 is provided outside of the frame 2 with a sprocket 23, which is used to transmit power from the power-shaft where a grade or sod roller has been substituted for the wheels.

When it is desired to use the steam-wagon shown in Fig. 1 for the purpose of grade-rolling, the rear end of the wagon is raised and supported by jacks, the removable journal-box 12 is opened and unbolted from the spring of the wagon, which releases the axle and wheel 7 from the journal-box on one side of the wagon, and the other end of the axle is then withdrawn from the fixed journal-box on the other side of the frame 2. In securing the grade-roller shown in Fig. 2 or the sod-roller shown in Fig. 3 to the apparatus I employ a grade-roller or a sod-roller of the usual construction, but having axles with one end adapted to fit in the fixed journal-box 9 exactly in the manner in which the axle of the wheel is fitted therein. The other end of the axle of either of these rollers, however, requires a journal and a journal-box of a different shape, a journal extending through the journal-box and being provided outside of the journal-box with a sprocket-wheel 29, having a sprocket-chain 30 extending to the sprocket 23. This journal-box 12 of the grade-roller 32 is strapped to the spring 13 of the platform in the manner already described, and the box itself is bolted about the journal of the roller, thus securing the roller in its proper position in the apparatus, replacing the wheels 7.

Where the grade-rollers are of the same diameter as the wheels 7, no change is needed in the front wheels 8; but where a sod-roller is secured in the apparatus, sod-rollers being usually of a comparatively smaller diameter, it becomes necessary to replace the wheels 8 with wheels 34 of a smaller diameter, and this is preferably done by unbolting the springs of the wheels 8 from the fifth-wheel frame of the wagon and bolting the journal-box housing 35 of the wheels 34 to this frame.

In order to provide a stearing apparatus which shall be suitable not only for use for the wagon but also for any kind of rollers that may be placed in the apparatus, I secure wire cables to the two ends of the fifth-wheel platform, and preferably crossing these cables 36 37 over sheaves 38 they extend to the drums 39 on the shaft 40, one cable being wound in one direction on one drum and the other cable being wound in the other direction on the other drum. On one end of the shaft 40 is a bevel gear-wheel 41, which meshes with the bevel-gear 42 on the end of the steering-shaft 43, which steering-shaft is provided with a hand-wheel 44.

Although I have described and shown journal-boxes of a particular construction, I do not desire to limit myself thereto.

The advantages of my invention result from the arrangement and construction of the parts by means of which the wheels and rollers may be substituted one for the other and by means of which a simple and quickly-acting steering action is imparted to the apparatus.

Having thus described my invention, what I claim, and desire to secure by Letters Patent, is—

1. A power-wagon having suitable power mechanism mounted on a frame or platform, a journal-box composed of separable parts, and means for removably attaching said journal-box, whereby one journal-box may be readily detached from the wagon-axle and another box substituted therefor; substantially as specified.

2. A power-wagon having a journal-box permanently attached to one side, and constituting a socket for the outer end of the axle, and a journal-box composed of separable parts detachably connected to the other side, whereby the latter box may be easily separated and disconnected and the axle may be removed; substantially as specified.

3. In a power-wagon the combination of a power mechanism mounted on a suitable platform, a roller having an axle provided with a sprocket, and a power-shaft having a coupling, whereby an auxiliary sprocket may be attached to the power-shaft to drive said roller; substantially as specified.

4. In a power-wagon, the combination of a power mechanism mounted on a suitable platform, a fixed journal-box and a removable journal-box, the removable journal-box being made in two parts to enable it to encircle the axle; substantially as specified.

In testimony whereof I have hereunto set my hand.

THOMAS GEORGE.

Witnesses:
JAMES K. BAKEWELL,
C. E. EGGERS.